(12) United States Patent
Knight

(10) Patent No.: US 9,426,077 B1
(45) Date of Patent: Aug. 23, 2016

(54) METHOD TO IMPROVE QUALITY OF SERVICE FOR REAL TIME INTERNET APPLICATIONS

(71) Applicant: Erik J. Knight, Phoenix, AZ (US)

(72) Inventor: Erik J. Knight, Phoenix, AZ (US)

( * ) Notice: Subject to any disclaimer, the term of this patent is extended or adjusted under 35 U.S.C. 154(b) by 57 days.

(21) Appl. No.: 14/628,292

(22) Filed: Feb. 22, 2015

(51) Int. Cl.
*H04L 12/853* (2013.01)
*H04M 7/00* (2006.01)
*H04L 12/26* (2006.01)

(52) U.S. Cl.
CPC ........ *H04L 47/2416* (2013.01); *H04L 43/0888* (2013.01); *H04M 7/006* (2013.01)

(58) Field of Classification Search
None
See application file for complete search history.

(56) References Cited

U.S. PATENT DOCUMENTS

| 7,251,216 | B2 | 7/2007 | Dube |
| 7,817,624 | B2 | 10/2010 | Dube |
| 8,767,568 | B2 | 7/2014 | Solsona |
| 2004/0184406 | A1 | 9/2004 | Iwamura et al. |
| 2005/0288050 | A1 | 12/2005 | Gill et al. |
| 2006/0114912 | A1 | 6/2006 | Kwan et al. |

OTHER PUBLICATIONS

Draytek Vigor 2830 Series User Guide V2.31 (See pp. 58, 70, 228, 234, 273, 292).

*Primary Examiner* — Huy D Vu
*Assistant Examiner* — James P Duffy
(74) *Attorney, Agent, or Firm* — Mark V. Loen

(57) ABSTRACT

A data router is programmed on power up to be automatically configured for VoIP packet priority by setting the correct ISP speeds. A relatively long term speed test is automatically done as part of the data router boot up. The speed test includes connecting to a large download/upload file on a remote location on the Internet. The initial ISP burst speed value is ignored when configuring the data router.

4 Claims, 4 Drawing Sheets

METHOD TO IMPROVE QUALITY OF SERVICE FOR REAL TIME INTERNET APPLICATIONS

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO SEQUENCE LISTING, A TABLE, OR COMPUTER PROGRAM LISTING

Not applicable.

BACKGROUND OF THE INVENTION (1) Field of the Invention

This invention is directed toward methods to improve voice and video communications.

In particular, to methods and apparatus which provide reliable communications over the Internet.

(2) Description of Related Art

Internet service providers (ISP) advertise connectivity speeds and sell their services based on being able to transmit data at those stated speeds. Users have the capability to check an ISP connectivity speed via web browser speed test for upload and download of data. ISPs have difficulty in providing such high speed connectivity services when the Internet traffic volume is high and congested, such as between 9 am and 5 pm.

One important method for an ISP to maintain customer satisfaction is to provide 'burst speeds' to customers. A burst speed for say, 5 to 30 seconds, will enable customers to check email, surf the web, and otherwise engage with the Internet in a rapid manner. When the user remains on a particular web page for reading, their data download demand is effectively stopped until they click to load the next web page. A customer's average bandwidth demand can be relatively low in this situation. However, when a customer downloads a large data file, an ISP will slow the customer connectivity speed based on their available bandwidth. This method, and other similar ones, help an ISP balance user satisfaction and available bandwidth through traffic management.

An end user who is connected to the Internet through an ISP traffic managed Internet connection, may also want to make phone or video calls over the Internet using voice over Internet protocol (VoIP). Making phone and video calls through the Internet is very affordable for the end user, and the VoIP data stream bandwidth between endpoints is relatively small compared to other Internet data streams. However, an end user who also is using the traffic managed connection by web surfing, email, blogging, looking at video clips, and the like will, at times, be very demanding on the available bandwidth. This can cause conflicts on bandwidth usage and between the Internet data streams and the VoIP data streams. The VoIP data stream may suffer, for example, if a large file is simultaneously downloaded and the download has a high priority through the end user router. Additionally, any inconsistent Internet speed causes degradation in real time Internet communications such as Voice and Video data packets. For example, VoIP data packets that have any significant delay are dropped and this will cause the VoIP transmission to become intermittent or of poor quality.

This is a known problem with VoIP data streams and many data routers can be configured to give VoIP data streams priority over the Internet data streams by reserving a portion of the Internet bandwidth for VoIP data streams. That way, both data streams can still be maintained based on a configured bandwidth. To avoid conflicts and to ensure that any VoIP communication is satisfactory, the data router restricts the connection speed to the lowest reasonable level from the ISP.

A data router can be a VoIP specific router such as a PBX router, or it can just route data to and from end users.

It should be noted, that a typical ISP connection will provide for a much faster download speed than an upload speed. Often, VoIP Quality of service (QoS) problems come from the lower upload connection speed. QoS is the overall performance of a telephony or computer network, particularly the performance seen by the computer network users.

To facilitate this, a data router is typically set up based on a speed test measurement to and from the ISP. Since the available bandwidth from the ISP usually varies, a one-time set up of a data router to establish the correct available bandwidth is problematical. A short ISP speed test based on the burst speed of the ISP will cause poor operation the router. VoIP priority will suffer when the ISP bandwidth is lower than the configured amount as the router will give too high a priority to Internet data streams rather than VoIP data streams.

Currently, a typical method to calibrate/configure router is:
1. Customer signs up for ISP service. A data router is then purchased and installed.
2. When the data router is being configured, an ISP Speed test is performed manually by an individual who is configuring the data router.
3. Once the ISP speeds are known (upload and download) the reliable speed is assumed to be somewhat lower—typically 10%.
4. The router is then configured on the reduced ISP speeds to slow down Internet traffic to ensure that the router will have a broadband large enough to effectively manage VoIP priority.
5. If the ISP has a significant speed change, then steps 1-4 have to be repeated.

An additional problem for a specialized data router setup is that it requires the end user to be highly knowledgeable about router configuration and settings, or for the data router supplier to set up each data router individually. In either case, current art requires this to be done manually, more or less, by performing the speed test independently and adjusting the router accordingly.

A problem with this procedure is that an ISP speed will change based on time of day or the season of the year, or for holidays, etc. When the speed changes significantly, the user will have to call the supplier of the data router to obtain help. A re-configuration based on a new speed test is likely to miss the problem.

Others have worked on VoIP priority problems. U.S. Pat. No. 7,251,216 describes a common way of addressing this problem. However, methods for providing an accurate Internet Service Provider (ISP) speed test were not addressed and are a key component of providing a high quality connection. Failure to correctly set up the router will lead to frustration with Quality of Service.

An ISP will have very fast communication speeds with a relatively few number of other ISPs, and a much lower, managed speed to a large number of local users. This can cause problems with VoIP and Internet data streams, as the priorities are likely to get jumbled to a local user.

The ability of a customer to understand why their VoIP QoS has degraded is limited. Calls to router support desks occur when this happens. The ability for a customer to retune their router settings for improved QoS is limited due to a lack of knowledge at to the correct issue to address. If a reconfiguration is needed, the help desk will then have to retest the local router and type in new settings. If it is fundamentally a speed issue, changing and testing a router is relatively labor intensive event.

What is needed to correct VoIP priority, is a way to automatically provide for a data router to self configure by determining the correct available bandwidth, and additionally, to be configured to manage traffic with an ISP based on an actual sustainable speed.

BRIEF SUMMARY OF THE INVENTION

A data router is programmed to auto configure for VoIP data packet priority by setting the correct ISP bandwidth ceilings by utilizing a long term speed test. The configuring program runs in the data router during startup and connects to a large download/upload file on a remote location on the Internet. The initial burst speed is ignored or averaged out during the speed test.

BRIEF DESCRIPTION OF THE SEVERAL VIEWS OF THE DRAWING(S)

DETAILED DESCRIPTION OF THE INVENTION

Figure 1:
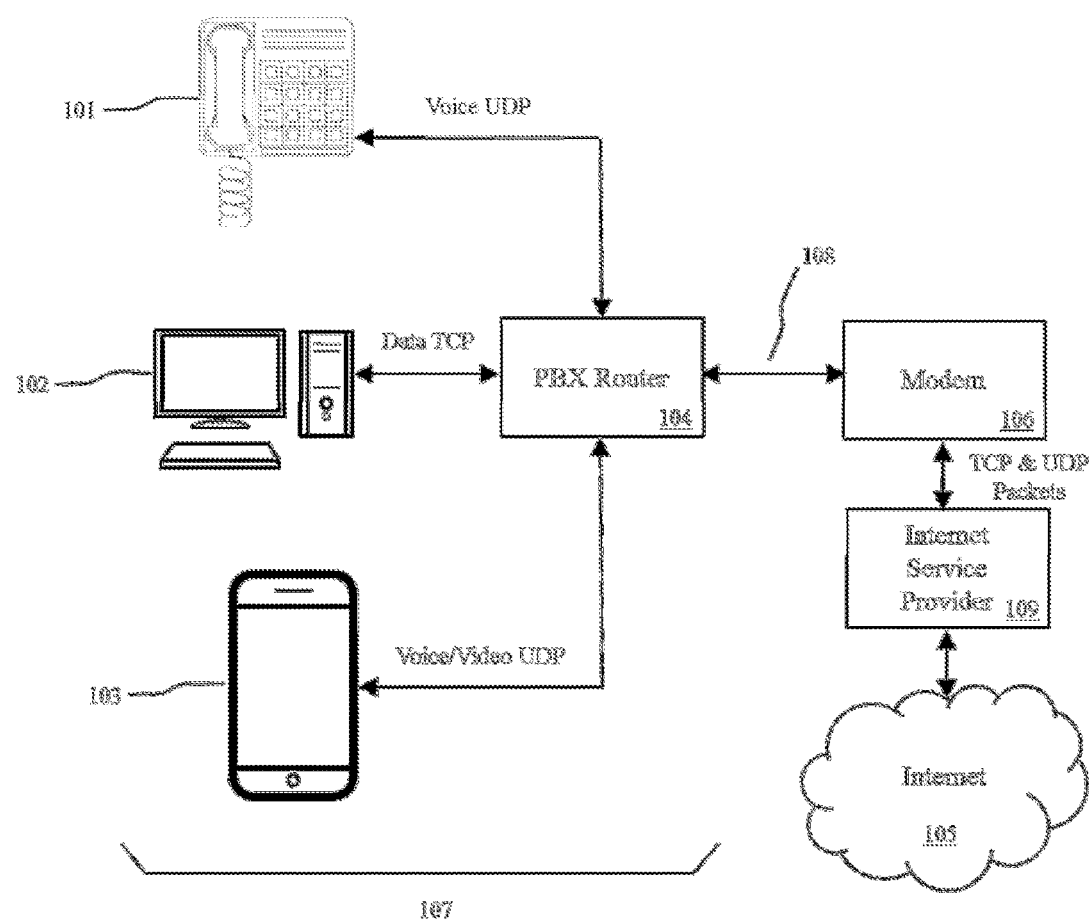
FIG. 1 is a block diagram showing how a data router receives and transmits TCP and UDP packets to other routers on the Internet.

In a large sense, the method applied to the data router is a traffic management scheme that resides on the data router which is between an ISP modem and the end users in a local network.

To determine the optimal ISP Speed, the data router is connected to an ISP. Then, on power up, programming instructions in an initialization program in the data router executes and performs the following steps:
1. Temporarily disable any local-area network (LAN) traffic to conduct an accurate test.
2. Speed test. The data router connects to a remote Internet website, such as supplier of the data router, through the Internet, and downloads a large testing data file for a long term speed test to and from the ISP (upload and download). The download speed test lasts between 30 seconds to ten minutes depending upon the testing data file size and ISP speeds. Similarly, the upload speed test for data router utilizes the testing data file downloaded from the remote location. The initial burst speeds are ignored by watching for a drop in speed to a lower value. The lowest measured upload and download speeds are then used as the accurate download/upload streaming rates for the purposes priority VoIP communication.
3. The initialization program configures the data router settings to the measured upload and download streaming speeds for VoIP traffic management.

When the data router is put into operation:
1. The data router then monitors upload and download traffic flow, which includes regulated and priority packet headers, class of service (COS) tagging and type.
2. When the upload streaming rate is near the configured upload speed ceiling, the data router ensures that priority VoIP data packets get through the gateway until the upload bandwidth drops below the configured maximum upload speed ceiling.
3. When the download streaming rate is near the configured download speed ceiling, the data router slows the acknowledgement of less desired data packets through the gateway. This prevents the sender from sending more packets until the bandwidth drops below the configured download speed ceiling.

The outcome is that this method solves an important QoS problem to provide clear quality for VoIP telephone calls.

Transmission Control Protocol (TCP) is one of the two core protocols of the Internet. TCP provides reliable, error-checked way of delivering data packets between computers that are connected to the Internet. TCP resides at the transport level. Email, web page browsing, search results, and file downloads are all done via TCP.

User Datagram Protocol (UDP) is the other common core protocol. In a UDP packet transmission, each packet is an isolated transaction and there are no procedures to check whether the UDP data packet arrived at the endpoint. A UDP packet includes an error checksum for the packet contents. The checksum tells the receiving endpoint whether the packet has integrity in transmission. If the endpoint device checksum calculation does not match the packet checksum, the packet is considered corrupted and ignored. There is no recovery procedure that requests the beginning point to re-send the packet and the beginning point is never informed that the packet did not arrive. Phone calls via VoIP and video over IP utilize UDP packets.

FIG. 1 shows a typical private network that includes video and voice devices. A voice only phone 101 is connected to a data router (specifically a PBX router) 104 that interfaces to the Internet 105 through a data router 106. Communication between the data router and the phone is via UDP data stream packets. A computer system 102 is also connected to the PBX router 104 and receives Internet based TCP data packets such as website pages, email, downloaded video clips. A VoIP voice only phone could also be a cell phone that connects to the data router via a wireless connection. A VoIP Audio/Video device 103, such as a smart phone, tablet computer, directly wired phone, or laptop computer is also connected to the PBX router 104 to receive Voice and Video UDP packets.

FIG. 1 shows a typical local network 107 that is connected 108 to the internet 105 via a modem 106. Normally, the purpose of a PBX Router 104 is to handle the local traffic at the local network level, and routes data between different locally connected equipment. It is important to optimize the connection 108 to the internet 105. Typically, the connection speed between the PBX Router 104 and the Internet Service Provider (ISP) 109 is slower than the connection speed between the ISP 109 supplier and the Internet 105. Since the PBX Router 104 does not control that speed or data stream priority, the ISP has varying data streams all coming in at once and funnels the bandwidth down to the local modem 106. This may cause poor control of priority data streams. One way to manage priority bandwidth between the PBX Router 104 and the ISP 109, is to configure the PBX Router to slow lower priority data streams by slowing the acknowledgement of lower priority data packets. In this way, the ISP is compelled to follow the data packet priorities established by the PBX Router.

FIG. 1 is one embodiment of the conceived invention. The illustrated PBX Router could also be a data router that prioritizes a particular packet stream. The packet would be chosen based on a criterion that includes packet type, bandwidth of the packet generation, and the ISP sustainable speed. The data router behaves similarly in that uploading and downloading packets are given priority based on the ISP sustainable speed.

Figure 2:
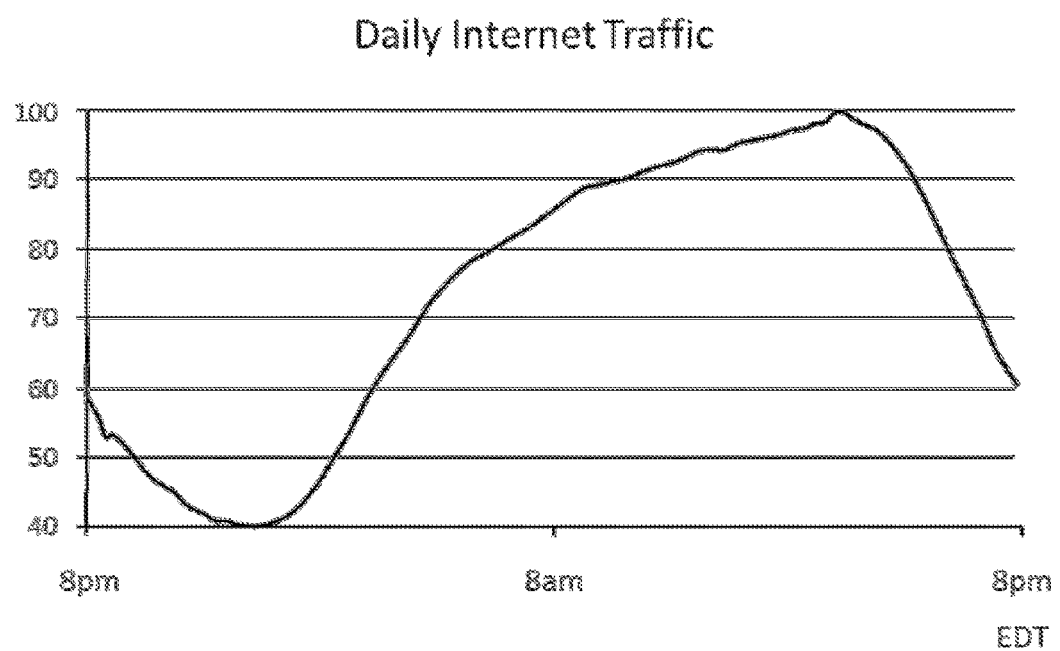
FIG. 2 is a graph of Internet usage for North America on a typical day.

FIG. 2 is a graph illustrates a snapshot of Internet traffic for North America. It shows how much Internet traffic varies during a single day. The y axis is an index based on peak traffic volume. This graph is based on Eastern Daylight Time, and so reflects multiple time zones. In general, usage of the Internet varies throughout the day with peak periods being between 9 am and 8 pm. If the ISP speed is checked during normal daytime working hours, the test should be a fair representation of serviceable speeds.

It is important to note that a speed test for a particular modem will vary during the day due to a change in Internet traffic as roughly illustrated in FIG. 2, but will also vary for other factors. The test will reflect the traffic seen at a local Internet service provider, as well as their equipment capabilities. For example, the ISP may have problems if it is in the process of revamping their equipment to improve speeds. Also, an ISP may have equipment maintenance problems, downstream bottlenecks, or outages. All these factors influence what the realistic connection speed will be for a particular user.

To test the ISP speed, the auto configure program downloads a small file size first, such as 30 megabytes, to test the ISP speed. The file resides on a remote router programming computer, located at a remote site. If the speed maintains without a drop, then the file size is increased to much a larger size, such as 500 Megabytes. The file is increased depending upon the connections speed. The larger file will be used if the connection speed is a fast one such as 100 Mbps or more. A 12 Mbps line would be considered slow by current standards.

Figure 3:
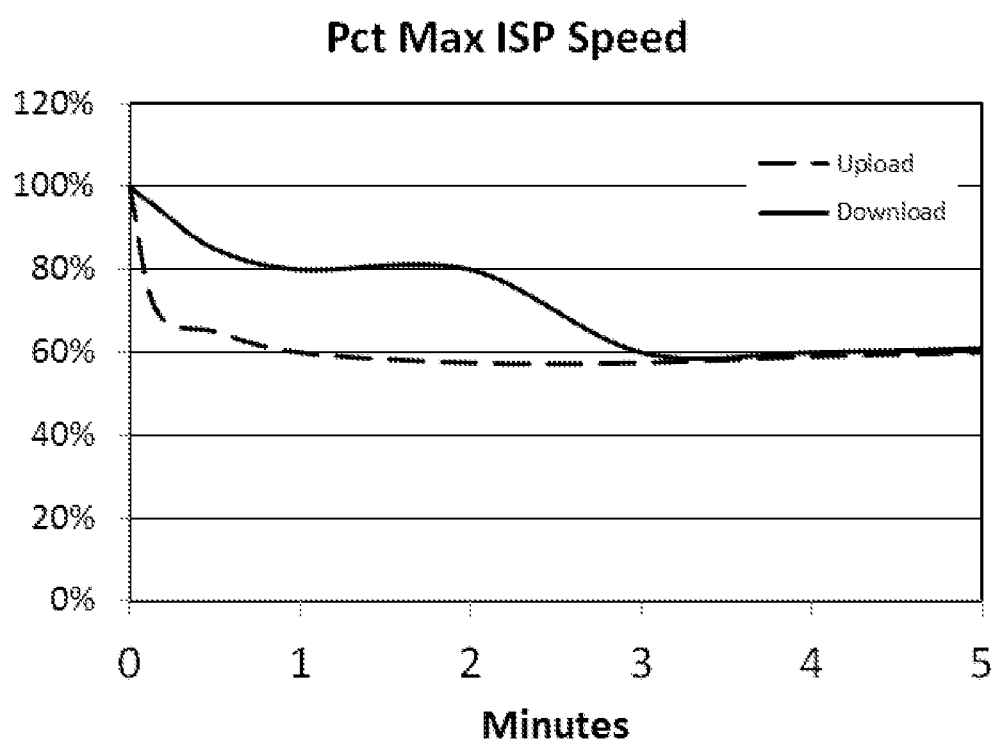
FIG. 3 is a graph showing an upload and download speed, and how the speeds vary with time during the test.

FIG. 3 is an illustrating graph showing an upload (dashed line) and download speed (solid line), and how the speeds vary with time during the test. As seen in the illustration of FIG. 3 the value for a continued sustained rate is not too difficult to obtain. The connect speeds in the five minute test shown will reveal the sustainable connection speed. To obtain an ISP sustainable speed, the test can be broken down into equal parts (such as five or ten) and the average lowest value in any single part is chosen. Or the average speed in the last part can be used.

A typical download/upload file size includes: a 10 to 500 Megabyte file—which works out well, but may need to be even larger in the future with higher connection speeds. A 30 megabyte file size is relatively small, and a 500 megabyte size is needed to test a fast connection. A very slow connect speed (such as 12 Mbps) can discover a drop in speed with a 30 megabyte file. However, a 500 Megabyte download/upload file size on a slow 12 Mbps connection speed would take too long for a customer to be happy with the time it takes to configure a data router. A 30 second to 10 minute (600 seconds) speed test time for a router is generally acceptable.

The data (or PBX) router then shapes traffic so that VoIP data streams have a high priority and reduces the likelihood that the data router is mis-configured for actual operation. There are no dynamic changes to the configured speed settings during operation of the data router.

Figure 4:
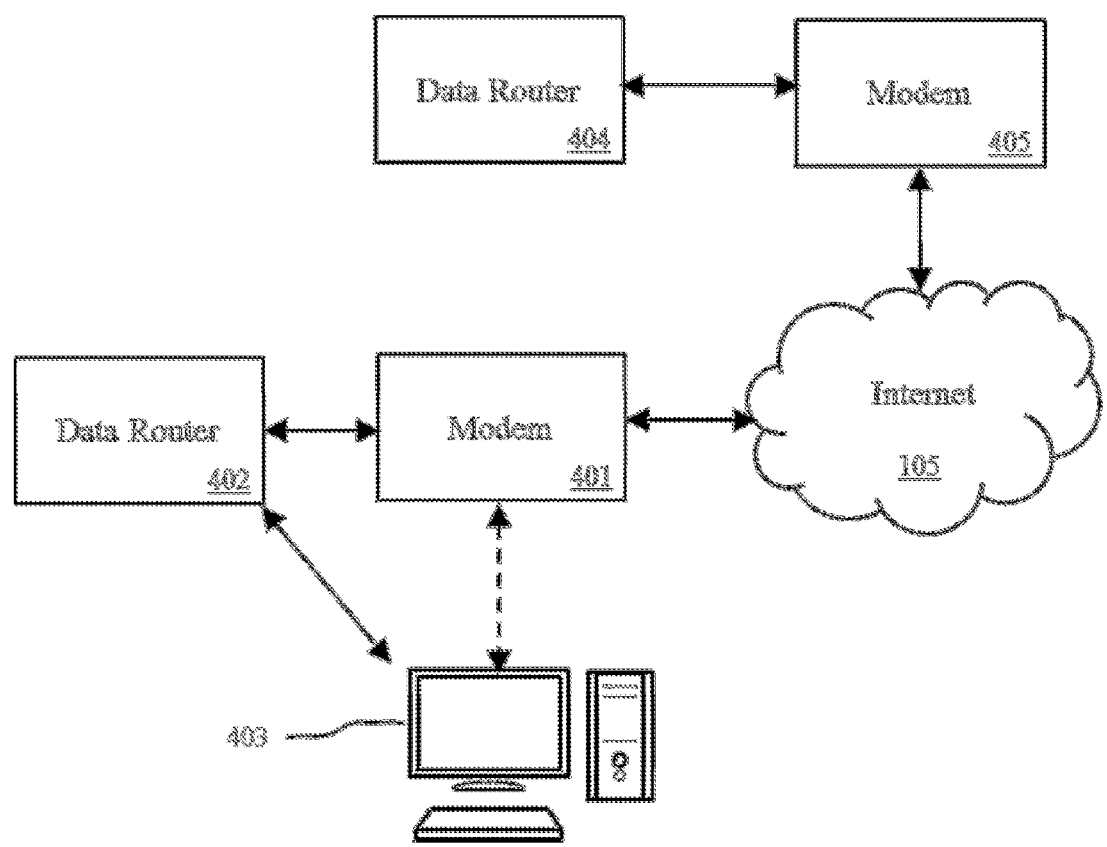
FIG. 4 is a block diagram showing a remote controlling site that is connected to a local data router.

FIG. 4 is a block diagram showing a remote router programming computer 403 that is connected to a local data router 404. The local data router 404 is connected to the Internet 105 via a local modem 405. The remote router programming computer 403 is also connected to the Internet 105 via a remote data router 402 and remote modem 401. Optionally, the router programming computer is directly connected to the remote modem 401.

For the purposes of this application, programming the data router means either programming it by use of a programming language in whole or in part, adjusting parameters in the data router database (i.e. configuring the data router), or both. In the later case, the data could have an internal program supplied by the data router supplier for operating. Configuring the router by changing the data variables causes it to operate in a designed manner.

A data router manages the flow of data packets in a dynamic manner based on the available bandwidth. This can be viewed as a data funnel. When a 100 MB or 1 GB LAN connection must slow down to a local 30 MB Internet connection, there are significant problems with speed matching. It is important that the priority data packets have priority to the 30 MB connection before any other data is transferred. The speed test defines how much of a data funnel happens at the local level.

If the end user is unhappy with the priority data packet quality, the user can initiate a reboot of the data router by power cycling the data router off and on. This causes the data router to boot up and re-check connection speeds and re-configure the priority packet traffic management speeds. Additionally, in an alternate embodiment, the user is able to trigger a retest anytime through a web-page interface to the router supplier. The router supplier (or another remote entity) will then send codes over the internet to reboot the data router or re-configure the data router after a speed test.

In one embodiment, the programming of the router speed setting is based on a simple setting such as "Normal", "Moderate" and "Aggressive". An aggressive setting will utilize the measured sustainable speed with a reduction factor applied to reduce the speed. A moderate setting will utilize the measured sustainable speed without any factor applied.

It is important to note that priority data packets need access to a constant amount of bandwidth all of the time. Therefore, configuring the data router to the actual sustainable ISP connection speeds is important.

The bandwidth needed for a single VoIP connection is relatively small for a typical ISP connection; a high quality uncompressed stream typically needs an ISP connection speed of only 100 Kbps.

The data router may track and prioritize packets other than UDP and TCP, such as ICMP, IGMP, and NDP.

While various embodiments of the present invention have been described, the invention may be modified and adapted to various operational methods to those skilled in the art. Therefore, this invention is not limited to the description and figure shown herein, and includes all such embodiments, changes, and modifications that are encompassed by the scope of the claims.

I claim:

1. An improved method of configuring a PBX router for improved VoIP data packet priority comprising:
    a) connecting said PBX router to an Internet service provider,
    b) establishing an initialization program in said PBX router which executes upon power up,
    c) providing for a testing data file to be located on a remote Internet website, d) providing programming instructions in said initialization program for said PBX router to
   i) temporarily disable any local network traffic,
   ii) connect to said remote Internet website,
   iii) utilize said testing data file in a speed test of data transfer to and from said Internet service provider, wherein said testing data file causes said speed test to be between 30 and 600 seconds long inclusive,
   iv) obtain a lowest measured upload speed and a lowest measured download speed from said speed test, and
   v) configure said PBX router utilizing said lowest measured upload speed and said lowest measured download speed for traffic management of said VoIP data packets,
whereby said PBX router manages priority of said VoIP data packet streams and Internet data streams when in use.

2. The method according to claim 1 wherein lower priority traffic flow through said PBX router is slowed down when lower priority traffic flow is near or above the PBX router configuration ceilings.

3. An improved method of configuring a data router for improved high priority data packet streams comprising:
   a) connecting said data router to an Internet service provider,
   b) establishing an initialization program in said data router which executes upon power up,
   c) providing for a testing data file to be located on a remote Internet site,
   d) providing programming instructions in said initialization program for said data router to
      i) temporarily disable any local network traffic,
      ii) connect to said remote Internet website,
      iii) utilize said testing data file in a speed test of data transfer to and from said Internet service provider, wherein said testing data file causes said speed test to be between 30 and 600 seconds long inclusive,
      iv) obtain a lowest measured upload speed and a lowest measured download speed from said speed test, and
      v) configure said data router utilizing said lowest measured upload speed and said lowest measured download speed for high priority data traffic management,
   whereby said data router manages high priority data streams and Internet data streams when in use.

4. The method according to claim 3 wherein lower priority data traffic flow through said data router is slowed down by slowing acknowledgement of said lower priority data when high priority traffic flow is near or above the data router configuration ceilings.

* * * * *